(12) United States Patent
Zapp et al.

(10) Patent No.: US 6,318,423 B1
(45) Date of Patent: Nov. 20, 2001

(54) PLUG NECK FOR A FILLER NECK OF A FUEL TANK

(75) Inventors: Thomas Zapp, Dortmund; Frank Reiter, Bad Soden, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/418,374

(22) Filed: Oct. 14, 1999

(30) Foreign Application Priority Data

Oct. 15, 1998 (DE) .............................................. 198 47 472

(51) Int. Cl.⁷ ...................................................... B65B 1/04
(52) U.S. Cl. ...................... 141/384; 141/302; 141/307; 220/86.2
(58) Field of Search ..................................... 141/348, 301, 141/302, 304, 305, 307, 308, 309, 310, 349, 350; 220/86.2

(56) References Cited

U.S. PATENT DOCUMENTS 5,215,132 * 6/1993 Kobayashi ........................... 141/302
5,983,963 * 11/1999 Pozgainer et al. .................... 141/302

FOREIGN PATENT DOCUMENTS

| 3605708 | 10/1986 | (DE) . |
| 3825418 | 2/1990 | (DE) . |
| 4343498 | 6/1994 | (DE) . |

* cited by examiner

*Primary Examiner*—David J. Walczak
*Assistant Examiner*—Huyen Le
(74) *Attorney, Agent, or Firm*—Robert J. Depke; Mayer, Brown & Platt

(57) ABSTRACT

A plug neck for a filler neck of a motor vehicle has exchanging means for refueling-venting adaptation to different refueling devices. In the case of a refueling device which removes gases from a refueling channel by suction, a compensation chamber is connected permanently to the refueling channel via a connecting channel. For adaptation to a refueling device without suction removal, the connecting channel is closed and the vent valve is provided with a cap which has a connection neck for a line leading to an activated carbon filter. This allows tool costs for producing the plug neck to be kept particularly low.

7 Claims, 4 Drawing Sheets

PLUG NECK FOR A FILLER NECK OF A FUEL TANK

FIELD OF THE INVENTION

The invention relates to automotive fuel tanks and specifically to a plug neck for a filler neck of a fuel tank of a motor vehicle having a flap which is arranged in a refueling channel which can be moved during refueling and is intended for switching a vent valve.

DESCRIPTION OF THE RELATED ART

Fuel tank plug necks are known for preventing the escape of fuel vapors during refueling and for pressure equalization with the surroundings during operation. At the end which is directed away from the filler neck, the plug neck bears a fuel-tank closure cover. In the operating position, the second compensation chamber, for the overflow of air in the vent valve, is connected to the refueling channel. During refueling, the flap is opened via a rocker lever and adjusts the vent valve into a position in which it closes the second compensation chamber. During refueling, air located in the fuel tank is discharged via the first compensation chamber.

It is necessary for the plug neck to be adapted for respective requirements which are to be met by the refueling venting when different refueling devices are used. For example, in the case of refueling devices which remove gases from the refueling channel by suction, it is necessary for the vent valve to connect the first compensation chamber to the refueling channel. In the case of refueling devices without suction removal, the first compensation tank has to be connected to an activated carbon filter. For the different refueling devices, different plug necks, which each require separate tools to produce them, have been used. This results, in particular in the case of mass production, in very cost-intensive production of the plug neck.

SUMMARY OF THE INVENTION

The present invention provides a plug neck of the type mentioned in the introduction such that it is particularly cost-effective to produce in particular in mass production. This is achieved by exchanging means for the optional connection of the first compensation chamber to a filter or the refueling channel.

This configuration means that all that is necessary for adapting the plug neck to the respective refueling device is to replace the exchanging means. This makes it possible for the plug neck according to the invention to be adapted to the envisaged application case with low structural outlay. Since the plug neck comprises the same components, with the exception of the exchanging means, for the two application cases, costs for storage and production of the plug neck according to the invention are kept particularly low.

According to an advantageous development of the invention, the exchanging means for connecting the first compensation chamber to the filter are of particularly cost-effective configuration if they have a cap with a connection neck for a line leading to the filter. Since the vent valve usually requires a cap anyway for the installation of a closure body located in the interior, this configuration does not result in an increase in the number of the components of the plug neck according to the invention.

The exchanging means for connecting the first compensation chamber to the refueling channel require particularly low structural outlay if they have connecting channel, which can be closed by an insert, between the first compensation chamber and the refueling channel. In the case of the vent valve being produced from plastic by injection molding, the connecting channel can easily be optionally released or closed by an insert which is to be positioned in the injection mold.

The closure element could be connected to the flap, for example, via a lever arrangement. The plug neck may be adapted for different space conditions with particularly low structural outlay, however, if a closure element of the vent valve is prestressed against an eccentric which can be moved by the flap. As a result, with an appropriate configuration of the eccentric, the vent valve may be arranged at virtually any desired angle to the flap.

The vent valve could have connection necks for a plurality of lines routed to the compensation chambers. This would require at least four connections and thus high installation outlay for the vent valve. However, the plug neck according to the invention can be installed particularly easily if the vent valve has a common flange for the connection to flanges of the two compensation chambers and of the filler neck. In addition, this means that only two sealing locations are necessary as a result, so that diffusion of fuel vapors from the plug neck is kept particularly low.

The connecting channel is particularly easily accessible, for adaptation to the respective application case of the plug neck according to the invention, if it is arranged in the outside of the vent valve and can be closed by a covering. The invention means that only two different coverings are necessary for the respective location case.

The plug neck according to the invention is configured particularly cost-effectively if the connecting channel is configured as a depression in the flange. In addition, this further reduces the number of the sealing locations accessible from outside the plug neck. According to another advantageous development of the invention, the plug neck may be configured in order to receive all the connections for the fuel tank if it has a connection for a roll-over valve. This considerably simplifies installation of the fuel tank in the motor vehicle.

The invention permits numerous embodiments. In order further to clarify its basic principle, two of these are explained hereinbelow and are illustrated in the drawing, in which:

DETAILED DESCRIPTION OF THE PRESENTLY PREFERRED EMBODIMENTS

Figure 1:
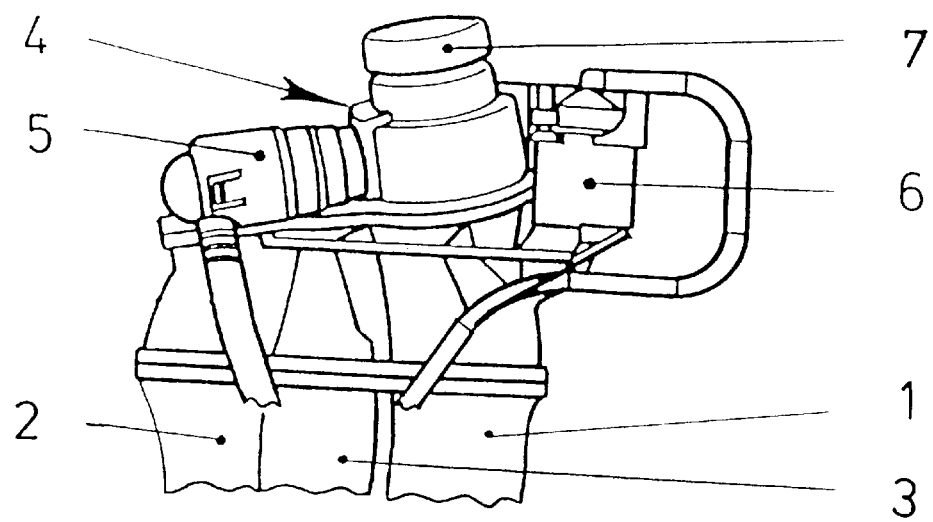
FIG. 1 illustrates a filler neck with a plug neck according to the invention and with adjacent components of a fuel tank.

FIG. 1 shows a filler neck 1 for a fuel tank of a motor vehicle with two compensation chambers 2, 3 and a plug neck 4. The plug neck 4 has a vent valve 5 which is connected to the two compensation chambers 2, 3. Furthermore, a roll-over valve 6 is connected to the plug neck 4. The vent valve 5 and the roll-over valve 6 are each connected to an activated carbon filter (not illustrated). On the top side, the plug neck 4 has a closure cover 7.

Figure 2:
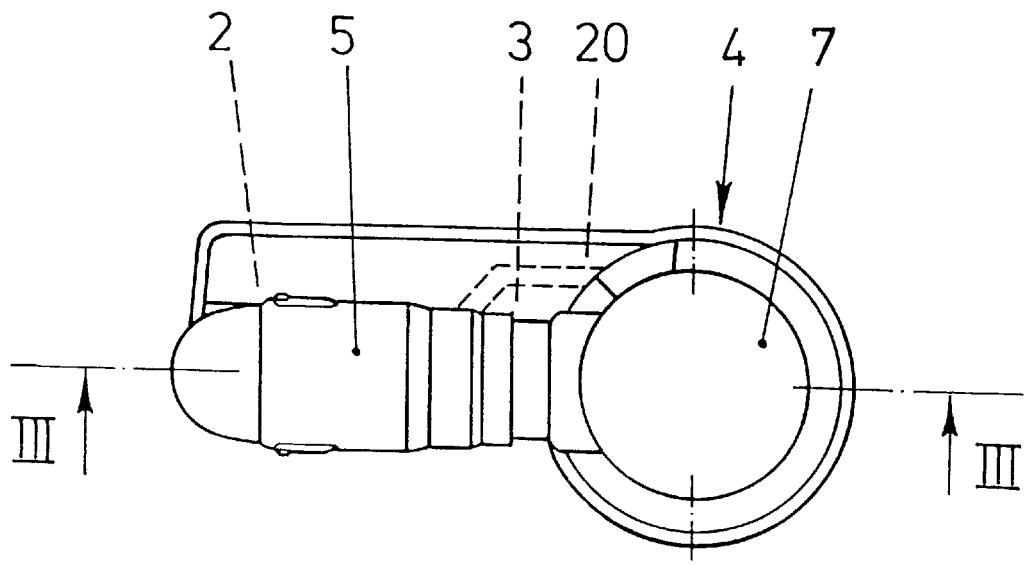
FIG. 2 illustrates a view from above of the plug neck according to the invention from FIG. 1.

FIG. 2 illustrates the plug neck 4 from FIG. 1 in an enlarged view from above. It can be seen here that a first compensation chamber 2 has a channel 20 routed to the plug neck 4, while the second compensation chamber 3 adjoins the plug neck 4 directly.

Figure 3:
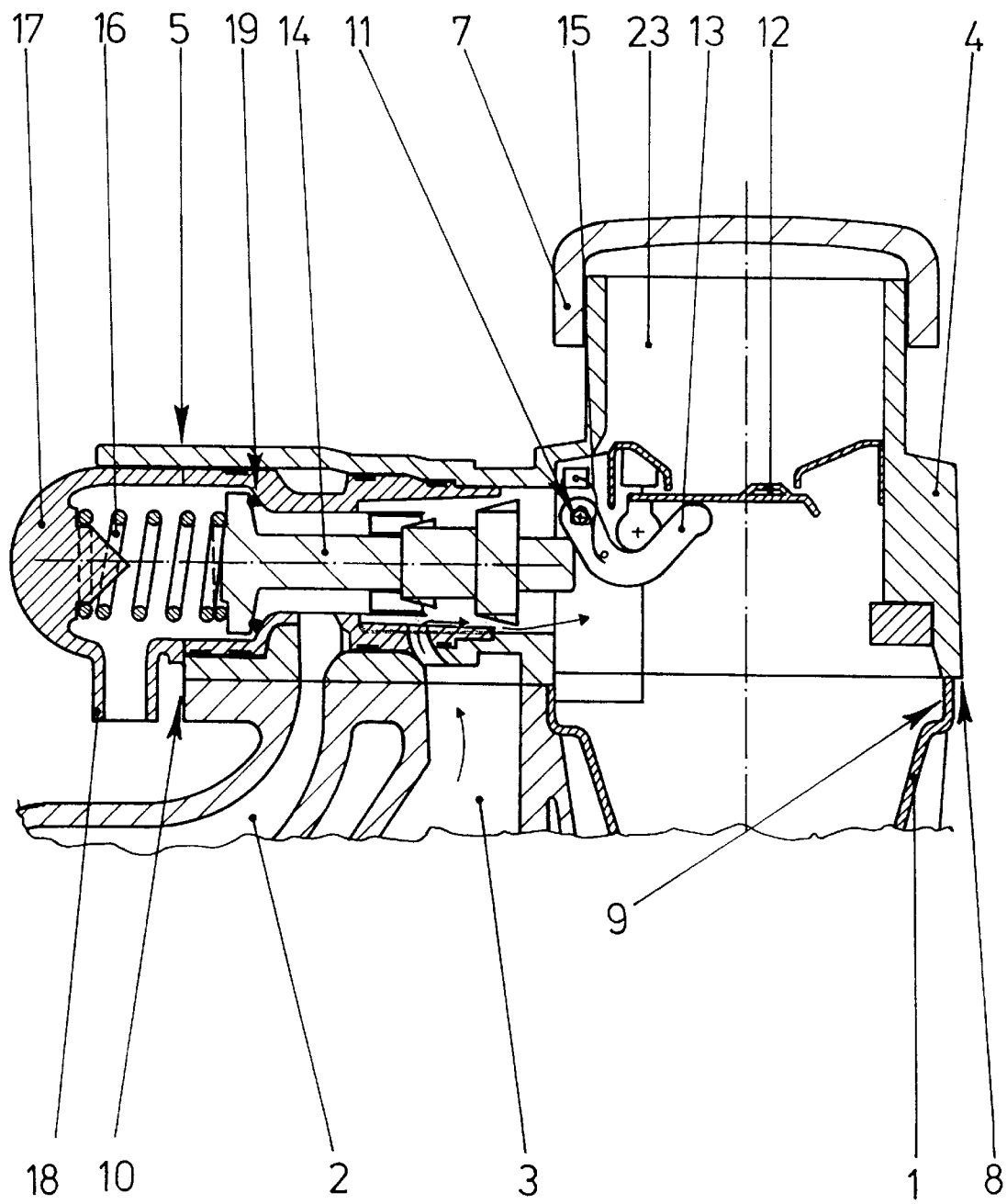
FIG. 3 illustrates a sectional illustration through the plug neck from FIG. 2 along line III—III during operational venting.

FIG. 3 shows the plug neck 4 from FIG. 2 in a sectional illustration along line III—III. The plug neck 4 and the filler neck 1 have a common central refueling channel 23. The plug neck 4 has a flange 8 for abutment against flanges 9, 10 of the compensation tanks 2, 3 and of the filler neck 1. Arranged in the refueling channel 23 is a flap 12 which can be pivoted about a pin 11 arranged perpendicularly to the plane of the drawing. Said flap 12 serves for pivoting an eccentric 13 which butts against a closure element 14 of the vent valve. The eccentric 13 is prestressed by a leg spring 15 against the flap 12 and retains the latter in the horizontal position depicted. A spring 16 is located on that side of the closure element 14 which is located opposite the eccentric 13. The spring 16 prestresses the closure element 14 into the position depicted. This position characterizes operational venting, in which fuel vapors can overflow from the second compensation chamber 3 into the refueling channel 23. For clarification purposes, the flow paths of the fuel vapors are illustrated by arrows. Of course, it is also possible for the fuel vapors to overflow in the opposite direction. The vent valve 5 has a cap 17 with a connection neck 18 from which a line (not illustrated specifically) leads to the activated carbon filter. In the case of operational venting, the closure element 14 of the vent valve 5 butts against a valve seat 19 and blocks a connection of the connection neck 18 of the cap 17 to the first compensation chamber 2.

Figure 4:
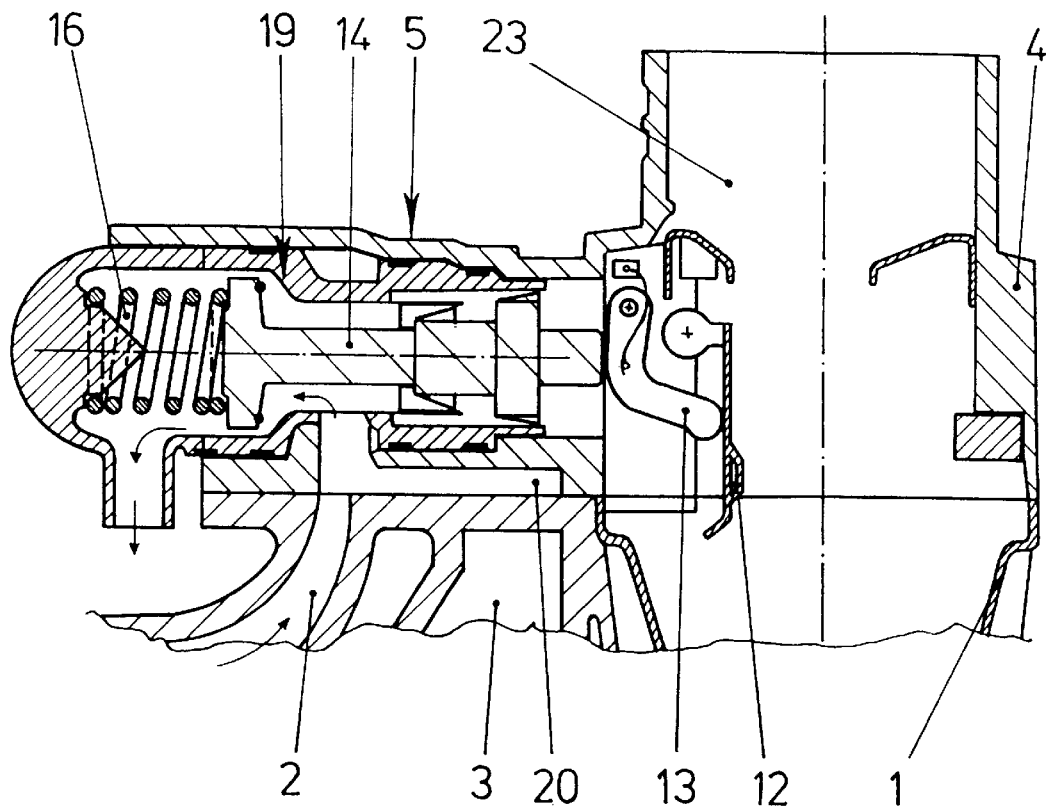
FIG. 4 illustrates an offset section of the plug neck from FIG. 2 during refueling venting.

FIG. 4 illustrates a section through the plug neck with released through flow of the refueling channel 23 for removal of gases by suction which does not take place through the refueling channel. Unlike FIG. 3, FIG. 4 shows the vent valve 5 in an offset section through the channel 20 illustrated in FIG. 2. The channel 20 is routed up to just in front of the refueling channel 23. In this region, the compensation chambers 2, 3 are not connected to the refueling channel 23. The closure element 14 is prestressed to the left here, counter to the force of the spring 16, and is located in a position in which it is remote from the valve seat 19. At the same time, the closure element 14 blocks the connection of the refueling channel 23 to the second compensation chamber 3. This prevents fuel from passing into the second compensation chamber 3 and into the refueling channel 23 during refueling. During refueling of the fuel tank, gases can be discharged from the first compensation chamber 2, via the connection neck 18 of the cap 17, to the activated carbon filter. This configuration of the plug neck 4 is thus suitable for refueling devices in the case of which no gases are removed from the refueling channel 23 by suction during refueling.

Figure 5:
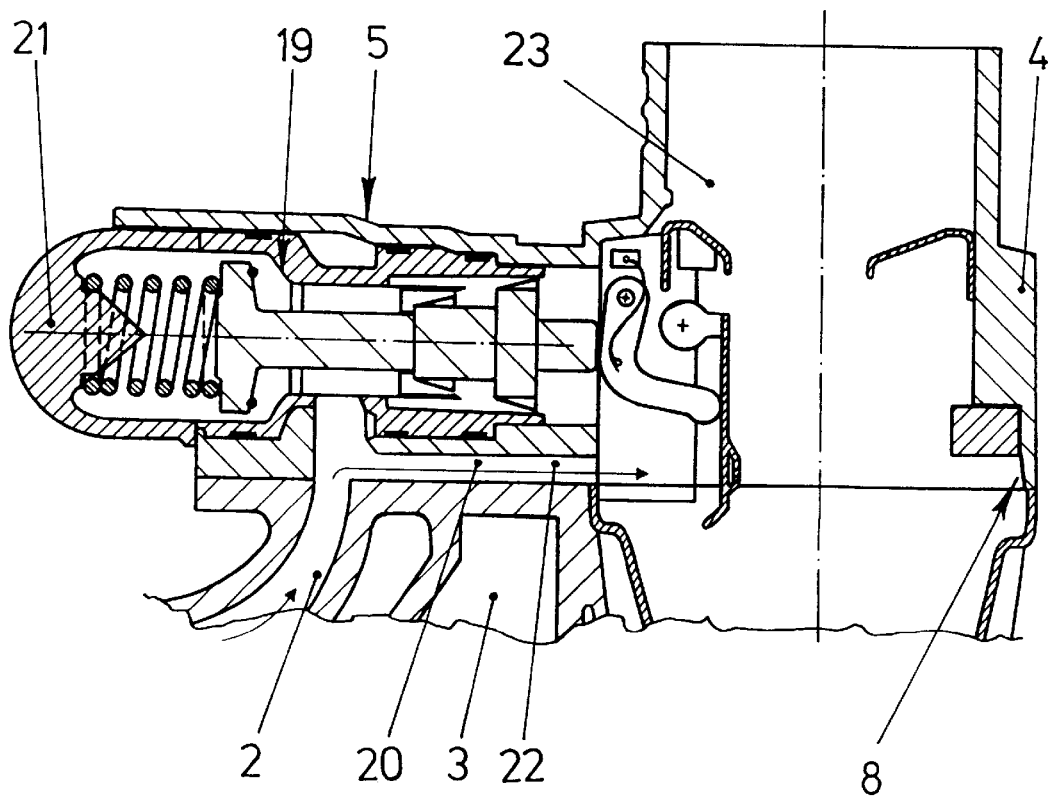
FIG. 5 illustrates the plug neck from FIG. 4 following adaptation to a refueling device with suction removal.
Figure 6:
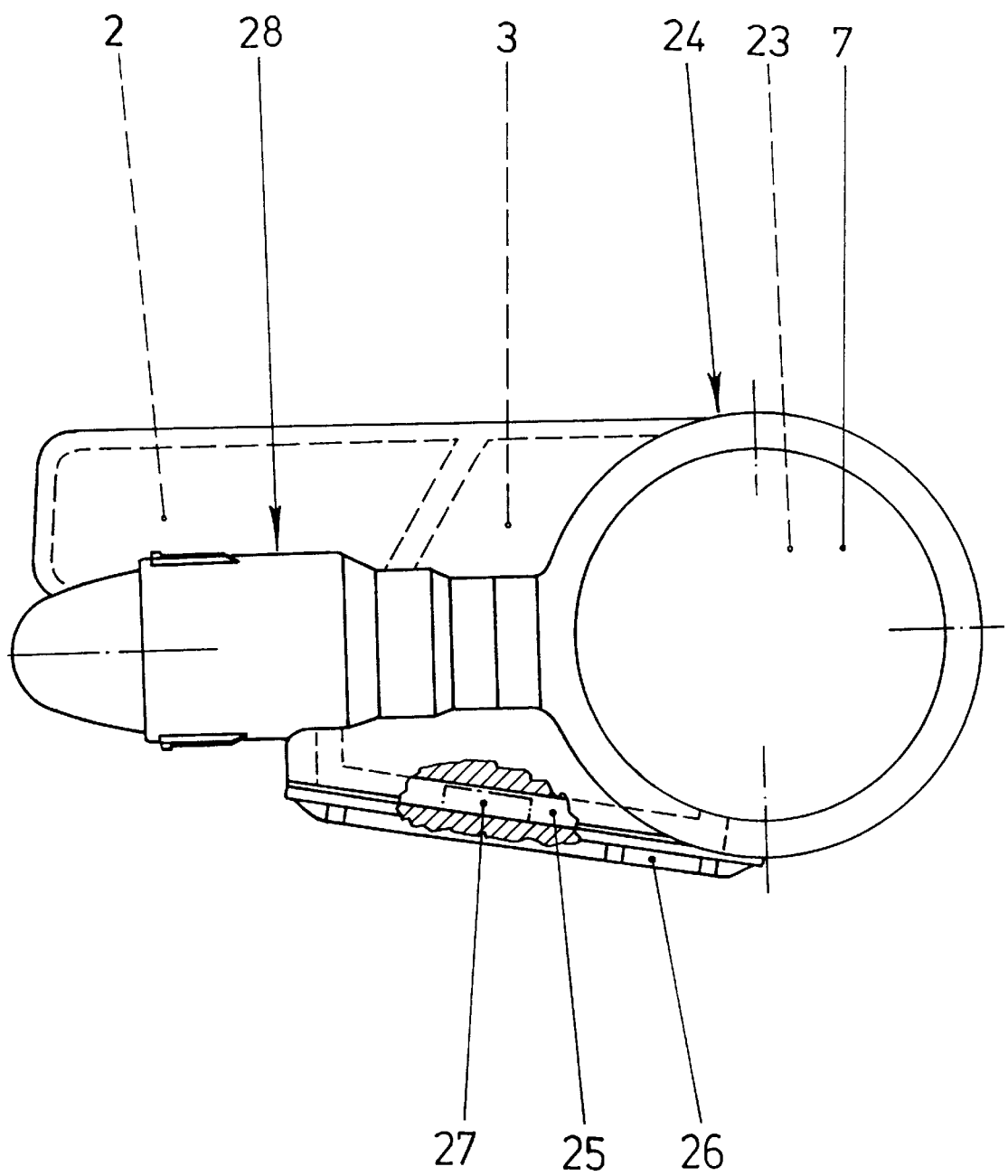
FIG. 6 illustrates a second embodiment of the plug neck according to the invention.

FIG. 5 shows the plug neck 4 from FIG. 4 following adaptation to a refueling device in the case of which gases displaced by the inflowing fuel are removed from the refueling channel 23 by suction. In this case, the vent valve 5 has a cap 21 without a connection neck. Furthermore, the channel 20 illustrated in FIG. 4 is adjoined by a connecting channel 22, which is routed into the refueling channel 23. The connecting channel 22 is configured as a depression in the flange 8 and can easily be produced, during production of the plug neck 4 from plastic, by an insert which produces the connecting channel 22 being positioned in an injection mold. This connects the first compensation chamber 2 permanently to the refueling channel 23. The operational venting takes place here as illustrated in FIG. 3. FIG. 6 shows a plug neck 24 in the case of which a connecting channel 25, concealed by a covering 26, is arranged on a vent valve 28. The connecting channel 25 connects the first compensation chamber 2 to the refueling channel 23. In accordance with the envisaged application case of the plug neck 4, the connecting channel 25 may be closed by a closure plug 27 arranged on a covering. The plug 27 is illustrated by chain-dotted lines in the drawing.

We claim:

1. A plug neck for a filler neck of a fuel tank of a motor vehicle, comprising:

a flap arranged in a refueling channel such that it is movable during refueling and for switching a vent valve;

a first compensation chamber connected to the vent valve for refueling venting;

a second compensation chamber connected to the vent valve for operational venting;

wherein the vent valve connects the second compensation chamber to the refueling channel during operation; and further comprising an exchanging means for alternate connection of the first compensation chamber via a switchover valve to a filter when used with a non-suction fueling device or the refueling channel when used with a suction refueling device for removing vapors.

2. The plug neck as claimed in claim 1, wherein the exchanging means for connecting the first compensation chamber to the filter has a cap with a connection neck.

3. The plug neck as claimed in claim 1, wherein the exchanging means for connecting the first compensation chamber to the refueling channel has a connecting channel which can be closed by a closure plug located between the first compensation chamber and the refueling channel.

4. The plug neck as claimed in claim 1, wherein a closure element of the vent valve is prestressed against an eccentric which can be moved by the flap.

5. The plug neck as claimed in claim 1, further comprising a connecting channel arranged outside of the vent valve for providing a path to the filter.

6. The plug neck as claimed in claim 5, where the connecting channel is a depression in a flange that connects the vent valve to the compensation chambers.

7. The plug neck as claimed in claim 1, further comprising a connection for a roll-over valve.

* * * * *